(12) United States Patent
Farrer et al.

(10) Patent No.: US 6,759,492 B2
(45) Date of Patent: *Jul. 6, 2004

(54) PROCESS FOR THE POLYMERIZATION OF ETHYLENE AND INTERPOLYMERS THEREOF

(75) Inventors: Don Kent Farrer, Longview, TX (US); Kenneth Alan Dooley, Longview, TX (US); Glenn Edward Moore, Longview, TX (US); Larry Allen Noble, Longview, TX (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/279,646

(22) Filed: Oct. 24, 2002

(65) Prior Publication Data

US 2003/0100688 A1 May 29, 2003

Related U.S. Application Data

(63) Continuation-in-part of application No. 09/912,141, filed on Jul. 24, 2001, now Pat. No. 6,635,726, and a continuation-in-part of application No. 09/912,148, filed on Jul. 24, 2001, and a continuation-in-part of application No. 09/912,171, filed on Jul. 24, 2001, now Pat. No. 6,646,073.

(51) Int. Cl.$^7$ .................................................. C08F 4/42
(52) U.S. Cl. ....................... 526/144; 526/901; 526/110; 526/121; 526/124.3
(58) Field of Search ................................ 526/110, 901, 526/121, 144, 124.3

(56) References Cited

U.S. PATENT DOCUMENTS

| | | | |
|---|---|---|---|
| 3,354,139 A | 11/1967 | Vandenberg | |
| 3,709,853 A | 1/1973 | Karapinka | |
| 4,003,712 A | 1/1977 | Miller | |
| 4,011,382 A | 3/1977 | Levine et al. | |
| 4,012,573 A | 3/1977 | Trieschmann et al. | |
| 4,250,288 A | * 2/1981 | Lowery, Jr. et al. | ........ 526/137 |
| 4,302,566 A | 11/1981 | Karol et al. | |
| 4,543,399 A | 9/1985 | Jenkins, III et al. | |
| 4,657,998 A | 4/1987 | Malpass | |
| 4,882,400 A | 11/1989 | Dumain et al. | |
| 5,118,769 A | 6/1992 | Kondo et al. | |
| 5,352,749 A | 10/1994 | DeChillis et al. | |
| 5,541,270 A | 7/1996 | Chinh et al. | |
| 5,863,995 A | * 1/1999 | Daire | .......................... 526/144 |
| 5,990,251 A | * 11/1999 | Gelus | ...................... 526/125.7 |
| 6,191,239 B1 | * 2/2001 | Ford et al. | ................ 526/123.1 |
| 6,635,726 B2 | 10/2003 | Farrer et al. | |
| 6,646,073 B2 | 11/2003 | Farrer et al. | |
| 6,660,817 B2 | 12/2003 | Farrer et al. | |

FOREIGN PATENT DOCUMENTS

| | | |
|---|---|---|
| EP | 0230707 A2 | 8/1987 |
| EP | 0529977 B1 | 3/1993 |
| EP | 0703246 A1 | 3/1996 |
| EP | 0 870 773 A1 | 10/1998 |
| WO | WO 00 58371 A1 | 10/2000 |
| WO | WO 00 75202 A1 | 12/2000 |
| WO | WO 02 28919 A1 | 4/2002 |
| WO | WO 02053607 A | 7/2003 |

OTHER PUBLICATIONS

"Group Notation Revised in Periodic Table," Chemical & Engineering News, 1985, p. 27, vol. 63, Issue 5.

* cited by examiner

*Primary Examiner*—Ling-Siu Choi
(74) *Attorney, Agent, or Firm*—Steven A. Owen; Bernard J. Graves, Jr.

(57) ABSTRACT

A novel continuous gas phase polymerization process for producing polyethylene and interpolymers of ethylene and at least one other olefin is provided wherein a non-aromatic halogenated hydrocarbon(s) is used in a specified amount such that the activity of the titanium, zirconium and/or hafnium containing Ziegler-Natta catalyst is increased.

17 Claims, No Drawings

PROCESS FOR THE POLYMERIZATION OF ETHYLENE AND INTERPOLYMERS THEREOF

This application is a continuation-in-part of applications with Ser. No. 09/912,141 now U.S. Pat. No. 6,635,726, Ser. Nos. 09/09/912,148 and 09/912,171 now U.S. Pat. No. 6,646,073, which were filed on Jul. 24, 2001.

FIELD OF INVENTION

The present invention relates to a continuous gas phase polymerization process for producing polyethylene and interpolymers of ethylene and at least one other olefin comprising introducing into a polymerization medium ethylene or ethylene and other olefin(s), a Ziegler-Natta catalyst comprising at least one transition metal component selected from titanium, zirconium, hafnium, or mixtures thereof, a co-catalyst component, and at least one non-aromatic halogenated hydrocarbon(s) wherein at least one or more non-aromatic halogenated hydrocarbon(s) is added in a molar ratio of non-aromatic halogenated hydrocarbon(s) to the transition metal component of the Ziegler-Natta catalyst from 0.2:1 to about 3:1. More specifically, the present invention relates to a process to enhance the activity of a Ziegler-Natta catalyst by adding at least one non-aromatic halogenated hydrocarbon(s) wherein at least one or more non-aromatic halogenated hydrocarbon(s) is added in a molar ratio of non-aromatic halogenated hydrocarbon(s) to the transition metal component of the Ziegler-Natta catalyst in a range of 0.2:1 to about 3:1; wherein the catalyst activity is increased over the range as compared with the process conducted outside the range.

BACKGROUND OF INVENTION

The use of halogenated hydrocarbons with Ziegler-Natta catalysts for the production of polyethylene is disclosed in U.S. Pat. Nos. 5,863,995; 5,990,251; 4,657,998 and 3,354,139. In general, it is disclosed that the halogenated hydrocarbons may reduce the rate of ethane formation, control the molecular weight of the polyethylene, produce polyethylenes with broad molecular weight distributions, or provide other effects.

In U.S. Pat. No. 5,990,251 it is disclosed that halogenated hydrocarbons are used, in a polymerization process for producing polyethylene utilizing a titanium based Ziegler-Natta catalyst for increasing the catalyst activity in the polymerization. It is further stated that the amount of halogenated hydrocarbon must be present in a molar ratio of halogenated hydrocarbon to titanium of the Ziegler-Natta catalyst from 0.001 to 0.15. Furthermore, it is disclosed that when the molar ratio of halogenated hydrocarbon to titanium is too high, the activity of the catalyst is not appreciably modified or is substantially reduced in a continuous polymerization process. It is also stated that when the molar ratio is too low, the catalyst activity is not substantially modified.

In U.S. Pat. No. 5,863,995, there is reference to catalytic activity in a process for producing polyethylene using a titanium containing Ziegler-Natta catalyst and a halogenated hydrocarbon in a specified amount. The patent states that the halogenated hydrocarbon is present in a molar ratio of halogenated hydrocarbon to the titanium in the catalyst of 0.01 to 1.8. It is further stated that the specified quantity of halogenated hydrocarbon results in no substantial variation of the average activity of the catalyst.

In U.S. Pat. No. 3,354,139, there is disclosed the use of halogenated hydrocarbons with a Ziegler-Natta catalyst to control the molecular weight of polyethylene prepared in a solution or slurry polymerization process.

In U.S. Pat. No. 4,657,998, there is disclosed a catalyst system comprising a titanium containing catalyst component, isoprenylaluminum and a halohydrocarbon for the production of polyethylene having a broad molecular weight distribution.

In this invention, applicants have unexpectedly found that in a continuous gas phase polymerization process for producing polyethylene and interpolymers of ethylene and at least one other olefin comprising introducing into a polymerization medium the ethylene or ethylene and at least one other olefin, a Ziegler-Natta catalyst comprising at least one transition metal component selected from titanium, zirconium, hafnium, or mixtures thereof, a co-catalyst component, and at least one non-aromatic halogenated hydrocarbon(s) wherein at least one or more non-aromatic halogenated hydrocarbon(s) is added in a molar ratio of non-aromatic halogenated hydrocarbon(s) to the transition metal component of the Ziegler-Natta catalyst in a range of about 0.2:1 to about 3:1, the activity of the catalyst is increased as compared with the process conducted outside the range. Applicants have also unexpectedly found that the increase in activity can be preceded by an initial decrease in catalyst activity for a period of time when the continuous process is transitioned to the molar ratio range.

SUMMARY OF THE INVENTION

In a first embodiment of this invention, a process for increasing catalyst activity in a continuous gas phase process for polymerizing ethylene or ethylene and at least one or more other olefin(s) is provided. The process comprises contacting, under polymerization conditions, the ethylene or ethylene and at least one or more other olefin(s) with a Ziegler-Natta catalyst comprising at least one transition metal component selected from the group consisting of titanium, zirconium, hafnium and mixtures thereof and a co-catalyst component, and at least one or more non-aromatic halogenated hydrocarbon(s) wherein the at least one or more non-aromatic halogenated hydrocarbon(s) is added in a molar ratio of non-aromatic halogenated hydrocarbon(s) to the transition metal component of the Ziegler-Natta catalyst from 0.2:1 to about 3:1.

In another embodiment of this invention, a process for increasing catalyst activity in a continuous gas phase process for polymerizing ethylene or ethylene and at least one or more other olefin(s) is provided. The process comprises contacting, under polymerization conditions, the ethylene or ethylene and at least one or more other olefin(s) with a Ziegler-Natta catalyst comprising at least one transition metal component selected from the group consisting of titanium, zirconium, hafnium and mixtures thereof, a co-catalyst component, and at least one or more non-aromatic halogenated hydrocarbon(s) wherein at least one or more non-aromatic halogenated hydrocarbon(s) is added in a molar ratio of non-aromatic halogenated hydrocarbon(s) to the transition metal component of the Ziegler-Natta catalyst in a range of 0.2:1 to about 3:1; wherein the catalyst activity is increased over the range as compared with the process conducted outside the range.

These objects, and other objects, will become more apparent to others with ordinary skill in the art after reading this disclosure.

DETAILED DESCRIPTION OF THE INVENTION

In the two embodiments of this invention, a process is provided for increasing catalyst activity in a continuous gas phase process for polymerizing ethylene or ethylene and at least one or more other olefin(s), the process comprising contacting, under polymerization conditions, the ethylene or ethylene and at least one or more other olefin(s) with a Ziegler-Natta catalyst comprising at least one transition metal component selected from the group consisting of titanium, zirconium, hafnium and mixtures thereof, a co-catalyst component, and at least one or more non-aromatic halogenated hydrocarbon(s); wherein at least one or more non-aromatic halogenated hydrocarbon(s) is added in a molar ratio of non-aromatic halogenated hydrocarbon(s) to the transition metal component of the Ziegler-Natta catalyst from 0.2:1 to about 3:1.

The continuous gas phase polymerization process for producing ethylene and interpolymers of ethylene and at least one other olefin may be carried out using any suitable continuous gas phase polymerization process. These types of processes and means for operating the polymerization reactors are well known and completely described in U.S. Pat. Nos. 3,709,853; 4,003,712; 4,011,382; 4,012,573; 4,302,566; 4,543,399; 4,882,400; 5,352,749 and 5,541,270. These patents disclose gas phase polymerization processes wherein the polymerization zone is either mechanically agitated or fluidized by the continuous flow of the gaseous monomer and diluent. The entire contents of these patents are incorporated herein by reference.

The polymerization process of the present invention is conducted in a continuous gas phase process such as, for example, a gas phase fluid bed process. A fluid bed reactor for use in the process of the present invention typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Makeup of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is compressed in a compressor, passed through a heat exchanger wherein the heat of polymerization and the heat of compression are removed, and then returned to the reaction zone.

In more detail, the reactor temperature of the gas phase process ranges from about 30° C. to about 130° C. In general, the reactor temperature is operated at the highest temperature that is feasible taking into account the sintering temperatures of the polymer product within the reactor.

The process of the present invention is suitable for the polymerization of ethylene and interpolymers of ethylene with at least one or more other olefins. The other olefins, for example, may contain from 3 to 16 carbon atoms. Included herein are homopolymers of ethylene and interpolymers of ethylene and the other olefin(s). The interpolymers include interpolymers of ethylene and at least one olefin(s) wherein the ethylene content is at least about 50% by weight of the total monomers involved. Exemplary olefins that may be utilized herein are propylene, 1-butene, 1-pentene, 1-hexene, 1-heptene, 1-octene, 4-methyl-1-pentene, 1-decene, 1-dodecene, 1-hexadecene and the like. Also utilizable herein are non-conjugated dienes and olefins formed in situ in the polymerization medium. When olefins are formed in situ in the polymerization medium, the formation of interpolymers of ethylene containing long chain branching may occur.

The polymerization reaction of the present invention is carried out in the presence of a Ziegler-Natta catalyst comprising at least one transition metal component selected from titanium, zirconium, hafnium, or mixtures thereof, and a co-catalyst. In the process of the invention, the components of the catalyst can be introduced in any manner known in the art. For example, the catalyst components can be introduced directly into the fluidized bed reactor in the form of a solution, a slurry or a dry free flowing powder. The catalyst can also be used in the form of a deactivated catalyst, or in the form of a prepolymer obtained by contacting at least one transition metal component with one or more olefins in the presence of a co-catalyst. The Ziegler-Natta catalyst can optionally contain magnesium and/or chlorine. Such magnesium and chlorine containing catalysts may be prepared by any manner known in the art.

The co-catalyst component of the Ziegler-Natta catalyst used in the process of the present invention can be any organometallic compound, or mixtures thereof, that can activate the titanium, zirconium or hafnium component of the Ziegler-Natta catalyst in the polymerization of ethylene homopolymers and interpolymers. In particular, the organometallic co-catalyst compound that is reacted with the titanium, zirconium or hafnium component contains a metal selected from Groups 1, 2, 11, 12, 13 and/or 14 of the Periodic Table of the Elements as published in "Chemical and Engineering News", 63(5), 27, 1985. In this format, the groups are numbered 1–18. Exemplary of such metals are lithium, magnesium, copper, zinc, aluminum, silicon and the like, or mixtures thereof.

Preferred for use herein are the organoaluminum compounds such as the trialkylaluminum compounds and dialkylaluminum monohalides. Examples include trimethylaluminum, triethylaluminum, trihexylaluminum, dimethylaluminum chloride, and diethylaluminum chloride.

The titanium, zirconium, hafnium, or mixtures thereof, component(s) of the Ziegler-Natta catalyst, with or without co-catalyst, may be deposited on a carrier. In so doing, there may be used as the carrier any catalyst carrier compound known in the art. Exemplary carriers are magnesium oxides, magnesium oxyhalides and magnesium halides, particularly magnesium chloride. The catalyst, with or without the carrier, may be supported on a solid porous support, such as silica, alumina and the like.

The Ziegler-Natta catalyst may contain conventional components in addition to the titanium, zirconium, hafnium, or mixtures thereof, component(s) and the organometallic co-catalyst component. For example, there may be added any internal or external electron donor(s) known in the art, and the like.

The Ziegler-Natta catalyst may be prepared by any method known in the art. The catalyst can be in the form of a solution, a slurry or a dry free flowing powder. The amount of Ziegler-Natta catalyst used is that which is sufficient to allow production of the desired amount of polymeric material.

The polymerization reaction is carried out in the presence of a non-aromatic halogenated hydrocarbon(s), added in a molar ratio of non-aromatic halogenated hydrocarbon(s) to the titanium, zirconium or hafnium transition metal component(s) of the Ziegler-Natta catalyst, from 0.2:1 to about 3:1. Preferably, the non-aromatic halogenated hydrocarbon(s) is added in a molar ratio ranging from about 0.2:1 to about 2:1. Most preferably, the non-aromatic halogenated hydrocarbon(s) is added in a molar ratio ranging from about 0.5 to about 1.5. Another range in which the non-aromatic halogenated hydrocarbon(s) is added is a molar ratio which comprises all combinations of a lower and an upper range wherein the lower range being any one of the following 0.2:1, 0.3:1, 0.4:1, 0.5:1, 0.6:1, 0.7:1, 0.8:1, 0.9:1, 1:1, 1.1:1, 1.2:1 and 1.3:1 and the upper range being any one of the following 1.5:1, 1.7:1, 2:1, 2.2:1, 2.4:1, 2.5:1, 2.7:1, 3.0:1, 3.2:1, 3.5:1.

Any non-aromatic halogenated hydrocarbon(s) may be used in the process of the present invention. If desired more than one non-aromatic halogenated hydrocarbon can be used. Typical of such non-aromatic halogenated hydrocarbons are monohalogen and polyhalogen substituted aliphatic and alicyclic hydrocarbons having 1 to 12 carbon atoms. Suitable, non-aromatic halogenated hydrocarbons are fluoromethane; chloromethane; bromomethane; iodomethane; difluromethane; dichloromethane; dibromomethane; diiodomethane; chloroform; bromoform; iodoform; carbon tetrachloride; carbon tetrabromide; carbon tetraiodide; bromofluoromethane; bromochloromethane; bromoiodomethane; chlorofluoromethane; chloroiodomethane; fluoroiodomethane; bromodifluromethane; bromodichloromethane; bromodiiodomethane; chlorodifluromethane; chlorodibromomethane; chlorodiiodomethane; fluorodichloromethane; fluorodibromomethane; fluorodiiodomethane; iododifluromethane; iododichloromethane; iododibromomethane; bromotrifluoromethane; bromotrichloromethane; bromotriiodomethane; chlorotrifluoromethane; chlorotribromomethane; chlorotriiodomethane; fluorotrichloromethane; fluorotribromomethane; fluorotriiodomethane; iodotrifluoromethane; iodotrichloromethane; iodotribromomethane; fluoroethane; chloroethane; bromoethane; iodoethane; 1,1-difluoroethane; 1,1-dichloroethane; 1,1-dibromoethane; 1,1-diiodoethane; 1,2-difluoroethane; 1,2-dichloroethane; 1,2-dibromoethane; 1,2-diiodoethane; 1-bromo-1-fluoroethane; 1-bromo-1-chloroethane; 1-bromo-1-iodoethane; 1-chloro-1-fluoroethane; 1-chloro-1-iodoethane; 1-fluoro-1-iodoethane; 1-bromo-2-fluoroethane; 1-bromo-2-chloroethane; 1-bromo-2-iodoethane; 1-chloro-2-fluoroethane; 1-chloro-2-iodoethane; 1-fluoro-2-iodoethane; 1,1,1-trifluoroethane; 1,1,1-trichloroethane; 1,1,1-tribromoethane; 1,1,1-triiodoethane; 1,1,2-trifluoroethane; 1,1,2-trichloroethane; 1,1,2-tribromoethane; 1,1,2-triiodoethane; 1-bromo-1,1-difluoroethane; 1-bromo-1,1-dichloroethane; 1-bromo-1,1-diiodoethane; 1-chloro-1,1-difluoroethane; 1-chloro-1,1-dibromoethane; 1-chloro-1,1-diiodoethane; 1-fluoro-1,1-dichloroethane; 1-fluoro-1,1-dibromoethane; 1-fluoro-1,1-diiodoethane; 1-iodo-1,1-difluoroethane; 1-iodo-1,1-dichloroethane; 1-iodo-1,1-dibromoethane; 1-bromo-1,2-difluoroethane; 1-bromo-1,2-dichloroethane; 1-bromo-1,2-diiodoethane; 1-chloro-1,2-difluoroethane; 1-chloro-1,2-dibromoethane; 1-chloro-1,2-diiodoethane; 1-fluoro-1,2-dichloroethane; 1-fluoro-1,2-dibromoethane; 1-fluoro-1,2-diiodoethane; 1-iodo-1,2-difluoroethane; 1-iodo-1,2-dichloroethane; 1-iodo-1,2-dibromoethane; 2-bromo-1,1-difluoroethane; 2-bromo-1,1-dichloroethane; 2-bromo-1,1-diiodoethane; 2-chloro-1,1-difluoroethane; 2-chloro-1,1-dibromoethane; 2-chloro-1,1-diiodoethane; 2-fluoro-1,1-dichloroethane; 2-fluoro-1,1-dibromoethane; 2-fluoro-1,1-diiodoethane; 2-iodo-1,1-difluoroethane; 2-iodo-1,1-dichloroethane; 2-iodo-1,1-dibromoethane; 1,1,1,2-tetrafluoroethane; 1,1,1,2-tetrachloroethane; 1,1,1,2-tetrabromoethane; 1,1,1,2-tetraiodoethane; 1,1,2,2-tetrafluoroethane; 1,1,2,2-tetraiodoethane; 2-bromo-1,1,1-trifluoroethane; 2-bromo-1,1,1-trichloroethane; 2-bromo-1,1,1-triiodoethane; 2-chloro-1,1,1-trifluoroethane; 2-chloro-1,1,1-tribromoethane; 2-chloro-1,1,1-triiodoethane; 2-fluoro-1,1,1-trichloroethane; 2-fluoro-1,1,1-tribromoethane; 2-fluoro-1,1,1-triiodoethane; 2-iodo-1,1,1-trifluoroethane; 2-iodo-1,1,1-trichloroethane; 2-iodo-1,1,1-tribromoethane; 1,1-dibromo-2,2-difluoroethane; 1,1-dibromo-2,2-dichloroethane; 1,1-dibromo-2,2-diiodoethane; 1,1-dichloro-2,2-difluoroethane; 1,1-dichloro-2,2-diiodoethane; 1,1-difluoro-2,2-diiodoethane; 1,2-dibromo-1,2-difluoroethane; 1,2-dibromo-1,2-dichloroethane; 1,2-dibromo-1,2-diiodoethane; 1,2-dichloro-1,2-difluoroethane; 1,2-dichloro-1,2-diiodoethane; 1,2-difluoro-1,2-diiodoethane; 2-bromo-2-chloro-1,1,1-trifluoroethane; hexafluoroethane; hexachloroethane; chloropentafluoroethane; iodopentafluoroethane; 1,2-dibromotetrachloroethane; fluoroethylene; chloroethylene; bromoethylene; iodoethylene; 1,1-difluorothylene; 1,1-dichloroethylene; 1,1-dibromoethylene; 1,1-diiodoethylene; 1,1,2-trifluorothylene; 1,1,2-trichloroethylene; 1,1,2-tribromoethylene; 1,1,2-triiodoethylene; 1,1,2,2-tetrafluorothylene; 1,1,2,2-tetrachloroethylene; 1,1,2,2-tetrabromoethylene; 1,1,2,2-tetraiodoethylene; 1-bromo-1,2,2-trifluorothylene; 1-bromo-1,2,2-trichloroethylene; 1-bromo-1,2,2-triiodoethylene; 1-chloro-1,2,2-trifluorothylene; 1-chloro-1,2,2-tribromoethylene; 1-chloro-1,2,2-triiodoethylene; 1-fluoro-1,2,2-trichloroethylene; 1-fluoro-1,2,2-tribromoethylene; 1-fluoro-1,2,2-triiodoethylene; 1-iodo-1,2,2-trifluorothylene, 1-iodo-1,2,2-trichloroethylene; 1-iodo-1,2,2-tribromoethylene; 1,1-dibromo-2,2-difluorothylene; 1,1-dibromo-2,2-dichloroethylene; 1,1-dibromo-2,2-diiodoethylene; 1,1-dichloro-2,2-difluoroethylene; 1,1-dichloro-2,2-diiodoethylene; 1,1-difluoro-2,2-diiodoethylene; 1,2-dibromo-1,2-difluorothylene; 1,2-dibromo-1,2-dichloroethylene; 1,2-dibromo-1,2-diiodoethylene; 1,2-dichloro-1,2-difluoroethylene; 1,2-dichloro-1,2-diiodoethylene; 1,2-difluoro-1,2-diiodoethylene; 1-fluoropropane; 1-bromopropane; 1-chloropropane; 1-iodopropane; 2-fluoropropane; 2-bromopropane; 2-chloropropane; 2-iodopropane; 1,3-difluoropropane; 1,3-dibromopropane; 1,3-dichloropropane; 1,3-diiodopropane; 1-fluorobutane; 1-bromobutane; 1-chlorobutane; 1-iodobutane; 2-fluorobutane; 2-bromobutane; 2-chlorobutane; 2-iodobutane; 1-fluoro-2-methylpropane; 1-bromo-2-methylpropane; 1-chloro-2-methylpropane; 1-iodo-2-methylpropane; 2-fluoro-2-methylpropane; 2-bromo-2-methylpropane; 2-chloro-2-methylpropane; 2-iodo-2-methylpropane; 1-fluoropentane; 1-bromopentane; 1-chloropentane; 1-iodopentane; 2-fluoropentane; 2-bromopentane; 2-chloropentane; 2-iodopentane; 3-fluoropentane; 3-bromopentane; 3-chloropentane; 3-iodopentane; 1-fluoro-2-methyl-butane; 1-bromo-2-methyl-butane; 1-chloro-2-methyl-butane; 1-iodo-2-methyl-butane; 1-fluoro-3-methyl-butane; 1-bromo-3-methyl-butane; 1-chloro-3-methyl-butane; 1-iodo-3-methyl-butane; 2-fluoro-2-methyl-butane; 2-bromo-2-methyl-butane; 2-chloro-2-methyl-butane; 2-iodo-2-methyl-butane; 1-fluoro-2,2-dimethylpropane; 1-bromo-2,2-dimethylpropane; 1-chloro-2,2-dimethylpropane; 1-iodo-2,2-dimethylpropane; hexafluoropropene; hexachloropropene; perfluoro-2-methyl-2-pentene; perfluoropropyl chloride;

perfluoroisopropyl chloride; perfluoropropyl iodide; perfluoroisopropyl iodide; 1,2-dibromohexafluoropropane; perfluoropentane; perfluorohexane; chlorocyclopropane; pentachlorocyclopropane; chlorocyclobutane; chlorocyclopentane; chlorocyclohexane; 1,1-dichlorocyclobutane; 1,1-dichlorocyclopentane; 1,1-dichlorocyclohexane; cis-1,2-dichlorocyclobutane; cis-1,2-dichlorocyclopentane; cis-1,2-dichlorocyclohexane; trans-1,2-dichlorocyclobutane; trans-1,2-dichlorocyclopentane; trans-1,2-dichlorocyclohexane; alpha-1,2,3,4,5,6-hexachlorocyclohexane; tetrachlorocyclopropane and the like Also suitable for use in the process of the present invention are any saturated halogenated hydrocarbon(s) or mixture thereof.

Preferred for use in the process of the present invention are dichloromethane; dibromomethane; chloroform; carbon tetrachloride; bromochloromethane; chlorofluoromethane; bromodichloromethane; chlorodifluromethane; fluorodichloromethane; chlorotrifluoromethane; fluorotrichloromethane; 1,2-dichloroethane; 1,2-dibromoethane; 1-chloro-1-fluoroethane; 1-chloro-1,1-difluoroethane; 1-chloro-1,2-difluoroethane; 2-chloro-1,1-difluoroethane; 1,1,1,2-tetrafluoroethane; 1,1,1,2-tetrachloroethane; 2-chloro-1,1,1-trifluoroethane; 1,1-dichloro-2,2-difluoroethane; 1,2-dichloro-1,2-difluoroethane; hexafluoroethane; hexachloroethane; chloropentafluoroethane and 1,2-dibromotetrachloroethane.

Even more preferred for use in the process of the present invention are dichloromethane; chloroform; carbon tetrachloride; chlorofluoromethane; chlorodifluoromethane; dichlorodifluoromethane, fluorodichloromethane; chlorotrifluoromethane; fluorotrichloromethane; 1,2-dichloroethane; 1,2-dibromoethane; 1,1,1,2-tetrachloroethane; 2-chloro-1,1,1-trifluoroethane; 1,1-dichloro-2,2-difluoroethane; 1,2-dichloro-1,2-difluoroethane; hexafluoroethane and hexachloroethane.

Most preferred for use in the process of the present invention is chloroform.

The non-aromatic halogenated hydrocarbons may be used individually or as mixtures thereof.

The non-aromatic halogenated hydrocarbon(s) may be added into the polymerization medium as such, or diluted in a liquid hydrocarbon such as an alkane for example, propane, n-butane, isobutane, n-pentane, isopentane, hexane, cyclohexane, heptane, octane and the like. The non-aromatic halogenated hydrocarbon(s) may be added by any method and at any point to the polymerization medium as such.

In carrying out the polymerization reaction of the present process there may be added other conventional additives generally utilized in processes for polymerizing olefins.

Any conventional additive may be added to the polyethylenes obtained by the present invention. Examples of the additives include nucleating agents, heat stabilizers, antioxidants of phenol type, sulfur type and phosphorus type, lubricants, antistatic agents, dispersants, copper harm inhibitors, neutralizing agents, foaming agents, plasticizers, anti-foaming agents, flame retardants, crosslinking agents, flowability improvers such as peroxides, ultraviolet light absorbers, light stabilizers, weathering stabilizers, weld strength improvers, slip agents, anti-blocking agents, anti-fogging agents, dyes, pigments, natural oils, synthetic oils, waxes, fillers and rubber ingredients.

The polyethylenes of the present invention may be fabricated into films by any technique known in the art. For example, films may be produced by the well known cast film, blown film and extrusion coating techniques.

Further, the polyethylenes may be fabricated into other articles of manufacture, such as molded articles, by any of the well known techniques.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES

In the following examples the test procedures listed below were used in evaluating the analytical properties of the polyethylenes and in evaluating the physical properties of the films of the examples.

a) Density is determined according to ASTM D-4883 from a plaque made according to ASTM D1928;

b) Melt Index (MI), $I_2$, is determined in accord with ASTM D-1238, condition E, measured at 190° C., and reported as decigrams per minute;

c) High Load Melt Index (HLMI), $I_{21}$, is measured in accord with ASTM D-1238, Condition F, measured at 10.0 times the weight used in the melt index test above;

d) Melt Flow Ratio (MFR)=$I_{21}/I_2$ or High Load Melt Index/Melt Index; and e) Residual Titanium Content in the Product. The residual titanium content in the product is measured by X-Ray Fluorescence Spectroscopy (XRF) using a Philips Sequential X-Ray Spectrometer Model PW 1480. The samples of the polymer to be evaluated were compression molded into a circular shaped plaque approximately 43 mm in diameter so as to fit the sample holder on the spectrometer and 3 to 5 mm in thickness and having a smooth flat surface. The molded test specimens were then placed in the XRF unit and the x-ray fluorescence arising from the titanium in the test specimen was measured. The residual titanium content was then determined based on a calibration curve obtained by measurements from polyethylene calibration specimens containing a known amount of titanium. The residual titanium content is reported as parts per million (ppm) relative to the polymer matrix.

f) The productivity of the catalyst or prepolymer (Productivity) is the ratio of kilograms of polyethylene produced per kilogram of catalyst or prepolymer added to the reactor.

g) The activity of the catalyst is expressed as grams of polyethylene per millimole titanium per hour of reaction and per 0.1 MPa of ethylene partial pressure [g PE·(mM Ti)$^{-1}$·h$^{-1}$·(0.1 MPa)$^{-1}$].

The transition metal component of the Ziegler-Natta catalyst used in Examples 1–12 herein was prepared in accordance with Example 1-a of European Patent Application EP 0 703 246 A1. The Ziegler-Natta catalyst was used in prepolymer form, and was prepared in accordance with Example 1-b of European Patent Application EP 0 703 246 A1.

Preparation of a Catalyst 4.6 m$^3$ of n-hexane, 5.5 kg of iodine, 3160 moles of magnesium, 29 moles of isobutanol, 60 moles of titanium tetra-n-propoxide and 60 moles of n-butyl chloride were introduced into a 10-m³ reactor fitted with a mechanical stirring system rotating at 150 revolutions per minute. The reactor was then heated to a temperature of 85° C. until the reaction began and then to 80° C. At this temperature 400 moles of titanium tetrachloride, 340 moles of titanium tetra-n-propoxide were introduced into the reactor, followed by 4700 moles of n-butyl chloride over 240 minutes. The mixture thus obtained was then kept stirred at 80° C. for 2 hours. A catalyst was thus obtained as a suspension in n-hexane.

The Ziegler-Natta catalyst thus obtained was used in prepolymer form, and was prepared in as follows:

Preparation of a Prepolymer 15.1 cubic meters of n-hexane, 142 moles of tri-n-octylaluminium and a quantity of catalyst prepared previously containing 142. moles of titanium were introduced into a 26.6 m³ stainless steel reactor maintained under nitrogen atmosphere and provided with a stirring device rotating at 65 revolutions per minute and heated to 70° C. Hydrogen was then introduced into it so as to obtain a partial pressure of 0.1 MPa, and ethylene at a steady flow rate of 617 kg/h for 8 hours and 15 minutes. At the end of this time, the reactor was degassed and its content was transferred into a mechanically stirred evaporator in which the n-hexane was removed by a circulation of nitrogen heated to 70° C. 5,090 kg of a prepolymer containing 35.7 g of polyethylene per millimole of titanium were then obtained.

In examples 1 through 11, a prepolymer containing about 35.7 grams of polyethylene per millimole of titanium, with a tri-n-octylaluminum (TnOA) to titanium molar ratio of about 1.0, was thus obtained.

The continuous polymerization process utilized in Examples 1–5 herein was carried out in a fluidized-bed reactor for gas-phase polymerization, consisting of a vertical cylinder of diameter 0.74 meters and height 7 meters and surmounted by a velocity reduction chamber. The reactor was provided in its lower part with a fluidization grid and with an external line for recycling gas, which connects the top of the velocity reduction chamber to the lower part of the reactor, at a point below the fluidization grid. The recycling line was equipped with a compressor for circulating gas and a heat transfer means such as a heat exchanger. In particular the lines for supplying ethylene, 1-hexene, hydrogen and nitrogen, which represent the main constituents of the gaseous reaction mixture passing through the fluidized bed, feed into the recycling line.

Above the fluidization grid, the reactor contained a fluidized bed ranging from about 270 kilograms to 450 kilograms consisting of a linear low-density polyethylene powder made up of particles with a weight-average diameter of about 0.7 mm. The gaseous reaction mixture, which contained ethylene, 1-hexene, hydrogen, nitrogen and minor amounts of other components, passed through the fluidized bed under a pressure ranging from about 290 psig (2.0 Mpa) to about 300 psig (2.1 MPa) with an ascending fluidization speed of about 1.7 feet per second (52 cm per second). Polymer product was removed intermittently from the reactor.

In Examples 1–5 a catalyst was introduced intermittently into the reactor, the catalyst comprising magnesium, chlorine and titanium and having been converted beforehand to a prepolymer, as described above, containing about 35.7 grams of polyethylene per millimole of titanium and an amount of tri-n-octylaluminum (TnOA) such that the molar ratio, Al/Ti, was equal to about 1.0. The rate of introduction of the prepolymer into the reactor was adjusted to achieve the desired production rate. During the polymerization, a solution of trimethylaluminum (TMA) in n-hexane, at a concentration of about 2 weight percent, was introduced continuously into the line for recycling the gaseous reaction mixture, at a point situated downstream of the heat transfer means. The feed rate of TMA is expressed as a molar ratio of TMA to titanium (TMA/Ti), and is defined as the ratio of the TMA feed rate (in moles of TMA per hour) to the prepolymer feed rate (in moles of titanium per hour). Simultaneously, a solution of tetrahydrofuran (THF) in n-hexane, at a concentration of about 1 weight percent, was introduced continuously into the line for recycling the gaseous reaction mixture. The feed rate of THF is expressed as a molar ratio of THF to titanium (THF/Ti), and is defined as the ratio of the THF feed rate (in moles of THF per hour) to the prepolymer feed rate (in moles of titanium per hour). Dinitrogen monoxide ($N_2O$) was added as a gas to the line for recycling the gaseous reaction mixture. The concentration of $N_2O$ in the gas phase polymerization medium is expressed in units of parts per million (ppm) by volume.

In Examples 1–5 a solution of chloroform ($CHCl_3$) in n-hexane, at a concentration of about 0.5 weight percent, was introduced continuously into the line for recycling the gaseous reaction mixture. The feed rate of $CHCl_3$ is expressed as a molar ratio of $CHCl_3$ to titanium ($CHCl_3$/Ti), and is defined as the ratio of the $CHCl_3$ feed rate (in moles of $CHCl_3$ per hour) to the prepolymer feed rate (in moles of titanium per hour). The $CHCl_3$ was added as a solution in n-hexane to the line for recycling the gaseous reaction mixture.

Example 1 (Comparative)

The continuous gas phase process conditions are given in Table 1 and the resin properties are given in Table 2. The molar ratio TMA/Ti was 7. The molar ratio $CHCl_3$/Ti was 0.1. The molar ratio THF/Ti was 0.3. The concentration of dinitrogen monoxide ($N_2O$) in the polymerization medium was 246 ppm by volume. 1-Hexene was used as comonomer. Under these conditions a polyethylene free from agglomerate was withdrawn from the reactor at a rate of 190 lb/h (86 kg/h). The productivity of the prepolymer was 136 kilograms of polyethylene per kilogram of prepolymer which corresponds to an activity of 112 [g PE·(mM Ti)$^{-1}$·h$^{-1}$·(0.1 MPa)$^{-1}$].

The polyethylene had a density of 0.916 g/cc, a melt index $MI_{2.16}$, $I_2$, of 1.0 dg/min and a Melt Flow Ratio, $I_{21}/I_2$, of 27.

Example 2

The continuous gas phase process conditions are given in Table 1 and the resin properties are given in Table 2. The molar ratio TMA/Ti was 7. The molar ratio THF/Ti was 0.3. The concentration of dinitrogen monoxide ($N_2O$) in the polymerization medium was 315 ppm by volume. 1-Hexene was used as comonomer. The molar ratio $CHCl_3$/Ti was increased from 0.1 to 2.0 in one step. Prior to the increase in the molar ratio $CHCl_3$/Ti the average activity of the catalyst was 112 [g PE·(mM Ti)$^{-1}$·h$^{-1}$·(0.1 MPa)$^{-1}$]. The resulting effect of increasing the molar ratio $CHCl_3$/Ti was a loss of catalyst activity for a three-hour period followed by a steady increase in catalyst activity over the next 15 hours of continuous operations. The transition took approximately 18 hours from the time the $CHCl_3$/Ti was increased in one step to a ratio of 2:1 until steady catalyst activity was achieved. After transitioning the molar ratio $CHCl_3$/Ti to 2 the polymerization process was operated for an additional 19 hours under essentially steady state conditions with respect to the gaseous composition in the reaction zone. Under these continuous gas phase process conditions a polyethylene free from agglomerate was withdrawn from the reactor at an average rate of 218 lb/h (98.9 kg/h). The productivity of the prepolymer was 269 kilograms of polyethylene per kilogram of prepolymer which corresponds to an activity of 240 [g PE·(mM Ti)$^{-1}$·h$^{-1}$·(0.1 MPa)$^{-1}$].

The polyethylene had a density of 0.917 g/cc, a melt index MI$_{2.16}$, I$_2$, of 0.8 dg/min and a Melt Flow Ratio, I$_{21}$/I$_2$, of 27.

Example 3

The continuous gas phase process conditions are given in Table 1 and the resin properties are given in Table 2. The molar ratio TMA/Ti was 7. The molar ratio THF/Ti was 0.3. The concentration of dinitrogen monoxide (N$_2$O) in the polymerization medium was 332 ppm by volume. 1-Hexene was used as comonomer. The molar ratio CHCl$_3$/Ti was decreased from 2.0 to 1.5 in one step. Prior to the decrease in the molar ratio CHCl$_3$/Ti the average activity of the catalyst was 240 [g PE·(mM Ti)$^{-1}$·h$^{-1}$·(0.1 MPa)$^{-1}$]. The resulting effect of decreasing the molar ratio CHCl$_3$/Ti was an increase of catalyst activity for about three hours followed by a steady decrease in catalyst activity over the next 3 hours of continuous operations. The transition took approximately 6 hours from the time the CHCl$_3$/Ti was decreased in one step to a ratio of 1.5:1 until steady catalyst activity was achieved. After transitioning the molar ratio CHCl$_3$/Ti to 1.5 the polymerization process was operated for an additional 18 hours under essentially steady state conditions with respect to the gaseous composition in the reaction zone. Under these continuous gas phase process conditions a polyethylene free from agglomerate was withdrawn from the reactor at an average rate of 215 lb/h (97.5 kg/h). The productivity of the prepolymer was 242 kilograms of polyethylene per kilogram of prepolymer which corresponds to an activity of 205 [g PE·(mM Ti)$^{-1}$·h$^{-1}$·(0.1 MPa)$^{-1}$].

The polyethylene had a density of 0.917 g/cc, a melt index MI$_{2.16}$, I$_2$, of 0.9 dg/min and a Melt Flow Ratio, I$_{21}$/I$_2$, of 27.

Example 4

The continuous gas phase process conditions are given in Table 1 and the resin properties are given in Table 2. The molar ratio TMA/Ti was 7. The molar ratio THF/Ti was 0.3. The concentration of dinitrogen monoxide (N$_2$O) in the polymerization medium was 305 ppm by volume. 1-Hexene was used as comonomer. The molar ratio CHCl$_3$/Ti was decreased from 1.5 to 0.5 in one step. Prior to the decrease in the molar ratio CHCl$_3$/Ti the average activity of the catalyst was 205 [g PE·(mM Ti)$^{-1}$·h$^{-1}$·(0.1 MPa)$^{-1}$]. The resulting effect of decreasing the molar ratio CHCl$_3$/Ti was an increase of catalyst activity for about three hours followed by a steady decrease in catalyst activity over the next 3 hours of continuous operations. The transition took approximately 6 hours from the time the CHCl$_3$/Ti was decreased in one step to a ratio of 0.5:1 until steady catalyst activity was achieved. After transitioning the molar ratio CHCl$_3$/Ti to 0.5 the polymerization process was operated for an additional 24 hours under essentially steady state conditions with respect to the gaseous composition in the reaction zone. Under these continuous gas phase process conditions a polyethylene free from agglomerate was withdrawn from the reactor at an average rate of 189 lb/h (85.7 kg/h). The productivity of the prepolymer was 220 kilograms of polyethylene per kilogram of prepolymer which corresponds to an activity of 165 [g PE·(mM Ti)$^{-1}$·h$^{-1}$·(0.1 MPa)$^{-1}$]. The polyethylene had a density of 0.917 g/cc, a melt index MI$_{2.16}$, I$_2$, of 0.9 dg/min and a Melt Flow Ratio, I$_{21}$/I$_2$, of 27.

TABLE 1

Reactor Conditions for Examples 1 through 4

| | Example | | | |
|---|---|---|---|---|
| | 1(Comparative) | 2 | 3 | 4 |
| Reactor Pressure, psig (MPa) | 297(205) 299(2.06) | 293(2.02) | 293(2.02) | |
| Reactor Temperature, °C. | 86 | 86 | 86 | 86 |
| Fluidized Bulk Density, lb/ft$^3$ (g/cm$^3$) | 14.9(0.239) 15.8(0.253) | 16.1(0.258) | 16.3(0.261) | |
| Reactor Bed Height, ft (meter) | 11.6 11.5(3.51) | 11.0(3.35) | 11.3(3.44) | |
| Ethylene, mole % | 50.0 | 50.6 | 50.6 | 50.0 |
| H$_2$/C$_2^1$ | 0.093 | 0.092 | 0.093 | 0.093 |
| C$_6$/C$_2^2$ | 0.123 | 0.112 | 0.112 | 0.118 |
| TMA/Ti$^3$ | 7 | 7 | 7 | 7 |
| CHCl$_3$/Ti$^4$ | 0.1 | 2.0 | 1.5 | 0.5 |
| THF/Ti$^5$ | 0.3 | 0.3 | 0.3 | 0.3 |
| N$_2$O, ppm by volume | 246 | 315 | 332 | 305 |
| Prepolymer Rate, lb/h (kg/h) | 1.4(0.64) 0.86(0.39) | 0.81(0.37) | 0.89(0.40) | |
| Production Rate, lb/h (kg/h) | 190(86.4) 189(85.7) | 218(98.9) | 215(97.5) | |
| Space Time Yield, kg/h·m$^3$ | 57.3 | 69.2 | 66.6 | 57.5 |
| Productivity, mass ratio | 136 | 269 | 242 | 220 |
| Activity$^6$ | 112 | 240 | 205 | 165 |
| Residual Titanium, ppm | 9.5 | 5.0 | 5.5 | 6.1 |

$^1$hydrogen to ethylene molar ratio;
$^2$1-hexene to ethylene molar ratio;
$^3$trimethylaluminum to titanium molar ratio;
$^4$chloroform to titanium molar ratio;
$^5$tetrahydrofuran to titanium molar ratio;
$^6$units of grams PE · (mmole Ti)$^{-1}$ · h$^{-1}$ · (0.1 MPa)$^{-1}$]

TABLE 2

Resin Properties for LLDPE prepared in Examples 1 through 3

| | Example | | | |
|---|---|---|---|---|
| | 1 | 2 | 3 | 4 |
| Density (g/cc) | 0.916 | 0.917 | 0.917 | 0.917 |
| Melt Index, $I_2$ (dg/min) | 1.0 | 0.8 | 0.9 | 0.9 |
| Melt Flow Ratio ($I_{21}/I_2$) | 27.3 | 26.6 | 26.6 | 26.6 |

TABLE 3

| Run | $CHCl_3/Ti$[1] | Activity[2] |
|---|---|---|
| A (comparative) | 4:1 | 30 |
| B | 2:1 | 250 |
| C | 3:1 | 160 |
| D | 3.5:1 | 90 |
| E (comparative) | 0 | 75 |

[1] Molar ratio of chloroform to titanium;
[2] units of [g PE · (mM Ti)$^{-1}$ · h$^{-1}$ · (0.1 MPa)$^{-1}$]

Example 5

The process of Example 4 was followed with the following exceptions:

1. the ethylene concentration in the reactor loop was maintained at 50.0 mole %,
2. the molar ratio of hydrogen to ethylene was set to 0.130,
3. the molar ratio of 1-hexene to ethylene was set to 0.110,
4. the prepolymer addition rate was fixed at 0.80 pounds per hour (0.36 kg/h),
5. the TMA to titanium molar ratio was set to 4,
6. the dinitrogen monoxide ($N_2O$) in the polymerization medium was maintained at 300 ppm by volume, and
7. the molar ratio of chloroform to titanium was varied.

The molar ratio of chloroform to titanium as shown in Runs A, B, C, D and E of Table 3 was present in amounts of 4.0:1; 2.0:1; 3.0:1; 3.5:1; and 0:1. At each of the five molar ratios of chloroform to titanium the activity of the catalyst was determined and reported.

The reactor was transitioned to a molar ratio of 4.0 (Run A) from a molar ratio of 2.0 in one step. The resulting effect of increasing the molar ratio to 4.0:1 was a loss of catalyst activity for about an eighteen-hour period until steady catalyst activity of 30 [g PE·(mM Ti)$^{-1}$·h$^{-1}$·(0.1 MPa)$^{-1}$] was achieved. The reactor was then transitioned to a molar ratio of 2.0 (Run B) from a molar ratio of 4.0 in one step. The resulting effect of decreasing the molar ratio to 2.0:1 was a steady increase in catalyst activity for about a six-hour period until steady catalyst activity of 250 [g PE·(mM Ti)$^{-1}$·h$^{-1}$·(0.1 MPa)$^{-1}$] was achieved. The reactor was then transitioned to a molar ratio of 3.0 (Run C) from a molar ratio of 2.0 in one step. The resulting effect of increasing the molar ratio to 3.0:1 was a steady decrease in catalyst activity for about a six-hour period until steady catalyst activity of 160 [g PE·(mM Ti)$^{-1}$·h$^{-1}$·(0.1 MPa)$^{-1}$] was achieved. The reactor was then transitioned to a molar ratio of 3.5 (Run D) from a molar ratio of 3.0 in one step. The resulting effect of increasing the molar ratio to 3.5:1 was a steady decrease in catalyst activity for about a ten-hour period until steady catalyst activity of 90 [g PE·(mM Ti)$^{-1}$·h$^{-1}$·(0.1 MPa)$^{-1}$] was achieved. The reactor was then transitioned to a molar ratio of 0 (Run E) from a molar ratio of 3.5 in one step. The resulting effect of decreasing the molar ratio to 0:1 was an initial increase in activity to about 300 [g PE·(mM Ti)$^{-1}$·h$^{-1}$·(0.1 MPa)$^{-1}$] over a three-hour period followed by a steady decrease in catalyst activity for about a thirty-hour period until steady catalyst activity of 75 [g PE·(mM Ti)$^{-1}$·h$^{-1}$·(0.1 MPa)$^{-1}$] was achieved.

Under each of these conditions a polyethylene free from agglomerate was withdrawn from the reactor.

Example 6–11

The continuous polymerization process utilized in Examples 6–11 herein was carried out in a fluidized-bed reactor for gas-phase polymerization, consisting of a vertical cylinder of diameter 5 meters and height 16 meters and surmounted by a velocity reduction chamber. The reactor was provided in its lower part with a fluidization grid and with an external line for recycling gas, which connects the top of the velocity reduction chamber to the lower part of the reactor, at a point below the fluidization grid. The recycling line was equipped with a compressor for circulating gas and a heat transfer means such as a heat exchanger. In particular the lines for supplying ethylene, 1-hexene, hydrogen and nitrogen, which represent the main constituents of the gaseous reaction mixture passing through the fluidized bed, feed into the recycling line.

Above the fluidization grid, the reactor contained a fluidized bed ranging from about 180,000 pounds (81,600 kilograms) to 210,000 pounds (95,300 kilograms) consisting of a linear low-density polyethylene powder made up of particles with a weight-average diameter of about 0.7 mm. The gaseous reaction mixture, which contained ethylene, 1-hexene, hydrogen, nitrogen and minor amounts of other components, passed through the fluidized bed under a pressure ranging from about 290 psig (2.0 Mpa) to about 300 psig (2.1 MPa) with an ascending fluidization speed of about 1.85 feet per second (56.4 cm per second).

In Examples 6–11 a catalyst was introduced intermittently into the reactor, the catalyst comprising magnesium, chlorine and titanium and having been converted beforehand to a prepolymer, as described above, containing about 35.7 grams of polyethylene per millimole of titanium and an amount of tri-n-octylaluminum (TnOA) such that the molar ratio, Al/Ti, was equal to about 1.0. The rate of introduction of the prepolymer into the reactor was adjusted to achieve the desired production rate. During the polymerization, a solution of trimethylaluminum (TMA) in n-hexane, at a concentration of about 45 weight percent, was introduced continuously into the line for recycling the gaseous reaction mixture, at a point situated downstream of the heat transfer means. The feed rate of TMA is expressed as a molar ratio of TMA to titanium (TMA/Ti), and is defined as the ratio of the TMA feed rate (in moles of TMA per hour) to the prepolymer feed rate (in moles of titanium per hour). Simultaneously, a solution of tetrahydrofuran (THF) in n-hexane, at a concentration ranging from 10 to 50 weight percent, was introduced continuously into the line for recycling the gaseous reaction mixture. The feed rate of THF is expressed as a molar ratio of THF to titanium (THF/Ti), and is defined as the ratio of the THF feed rate (in moles of THF per hour) to the prepolymer feed rate (in moles of titanium per hour). Dinitrogen monoxide ($N_2O$) was added as a gas to the line for recycling the gaseous reaction mixture. The concentration of $N_2O$ in the gas phase polymerization medium is expressed in units of parts per million (ppm) by volume.

In Examples 6–11 a solution of chloroform ($CHCl_3$) in n-hexane, at a concentration ranging from 2 to 25 weight percent, was introduced continuously into the line for recycling the gaseous reaction mixture. The feed rate of $CHCl_3$ is expressed as a molar ratio of $CHCl_3$ to titanium ($CHCl_3$/Ti), and is defined as the ratio of the $CHCl_3$ feed rate (in moles of $CHCl_3$ per hour) to the prepolymer feed rate (in moles of titanium per hour). The $CHCl_3$ was added as a solution in n-hexane to the line for recycling the gaseous reaction mixture.

Example 6 (Comparative)

The continuous gas phase process conditions are given in Table 4 and the resin properties are given in Table 5. The molar ratio of TMA/Ti was 7. The molar ratio of $CHCl_3$/Ti was 0.04. The molar ratio of THF/Ti was 0.3. The concentration of dinitrogen monoxide (N2O) in the polymerization medium was about 349 ppm by volume. 1-Hexene was used as comonomer. Under these conditions a polyethylene free from agglomerates was withdrawn from the reactor at a rate of about 24,900 kilograms/hr (54,800 lbs/hr). The productivity of the prepolymer was about 85 kilogramss of polyethylene per kilogram of prepolymer which corresponds to an activity of about 90 [g PE·(mM Ti)$^{-1}$·h$^{-1}$·(0.1 Mpa)$^{-1}$]. The polyethylene had a density of 0.920 g/cc, a melt index of 1.1 dg/min and a Melt Flow Ratio of 26.3.

Example 7 (Comparative)

The continuous gas phase process conditions are given in Table 4 and the resin properties are given in Table 5. The molar ratio of TMA/Ti was 7. The molar ratio of THF/Ti was 0.3. The concentration of dinitrogen monoxide (N2O) in the polymerization medium was about 349 ppm by volume. 1-Hexene was used as comonomer. The molar ratio $CHCl_3$/Ti was increased from 0.04 to 0.1 in one step. Prior to the increase in the molar ratio $CHCl_3$/Ti the average activity of the catalyst was 90 [g PE·(mM Ti)$^{-1}$·h$^{-1}$·(0.1 MPa)$^{-1}$]. The activity did not change significantly for the first 2.5 hours after increasing the molar ratio $CHCl_3$/Ti. Over the next 6 hours the activity increased to 92 [g PE·(mM Ti)$^{-1}$·h$^{-1}$·(0.1 MPa)$^{-1}$]. The transition took approximately 8.5 hours from the time the $CHCl_3$/Ti was increased in one step to a ratio of 0.1:1 until steady catalyst activity was achieved.

Under these conditions a polyethylene free from agglomerates was withdrawn from the reactor at a rate of about 22,900 kilograms/hr (50,500 lbs/hr). The productivity of the prepolymer was about 87 kilograms of polyethylene per kilogram of prepolymer which corresponds to an activity of about 92 [g PE·(mM Ti)$^{-1}$·h$^{-1}$·(0.1 Mpa)$^{-1}$].

The polyethylene had a density of 0.920 g/cc, a melt index of 1.0 dg/min and a Melt Flow Ratio of 26.0.

Example 8

The continuous gas phase process conditions are given in Table 4 and the resin properties are given in Table 5. The molar ratio of TMA/Ti was 7. The molar ratio of THF/Ti was 0.3. The concentration of dinitrogen monoxide (N2O) in the polymerization medium was about 352 ppm by volume. 1-Hexene was used as comonomer. The molar ratio $CHCl_3$/Ti was increased from 0.1 to 0.2 in one step. Prior to the increase in the molar ratio $CHCl_3$/Ti the average activity of the catalyst was 92 [g PE·(mM Ti)$^{-1}$·h$^{-1}$·(0.1 MPa)$^{-1}$]. The activity did not change significantly for the first 1.75 hours after increasing the molar ratio $CHCl_3$/Ti. Over the next 2.75 hours the activity increased to 111 [g PE·(mM Ti)$^{-1}$·h$^{-1}$·(0.1 MPa)$^{-1}$]. The transition took approximately 4.5 hours from the time the $CHCl_3$/Ti was increased in one step to a ratio of 0.2:1 until steady catalyst activity was achieved.

Under these conditions a polyethylene free from agglomerates was withdrawn from the reactor at a rate of about 24,700 kilograms/hr (54,400 lbs/hr). The productivity of the prepolymer was about 100 kilograms of polyethylene per kilogram of prepolymer which corresponds to an activity of about 111 [g PE·(mM Ti)$^{-1}$·h$^{-1}$·(0.1 Mpa)$^{-1}$].

The polyethylene had a density of 0.920 g/cc, a melt index of 1.0 dg/min and a Melt Flow Ratio of 26.3.

Example 9

The continuous gas phase process conditions are given in Table 4 and the resin properties are given in Table 5. The initial molar ratio of TMA/Ti was 7. The molar ratio of THF/Ti was 0.3. The concentration of dinitrogen monoxide (N2O) in the polymerization medium was about 350 ppm by volume. 1-Hexene was used as comonomer. The molar ratio $CHCl_3$/Ti was increased from 0.2 to 0.3 in one step. Prior to the increase in the molar ratio $CHCl_3$/Ti the average activity of the catalyst was 111 [g PE·(mM Ti)$^{-1}$·h$^{-1}$·(0.1 MPa)$^{-1}$]. The activity did not change significantly for the first 15 hours after increasing the molar ratio $CHCl_3$/Ti. Over the next 4.5 hours the activity increased to 143 [g PE·(mM Ti)$^{-1}$·h$^{-1}$·(0.1 MPa)$^{-1}$]. The transition took approximately 19.5 hours from the time the $CHCl_3$/Ti was increased in one step to a ratio of 0.2:1 until steady catalyst activity was achieved. During this time the molar ratio of TMA/Ti was reduced from 7 down to 5.

Under these conditions a polyethylene free from agglomerates was withdrawn from the reactor at a rate of about 25,400 kilograms/hr (56,000 lbs/hr). The productivity of the prepolymer was about 129 kilograms of polyethylene per kilogram of prepolymer which corresponds to an activity of about 143 [g PE·(mM Ti)$^{-1}$·h$^{-1}$·(0.1 Mpa)$^{-1}$].

The polyethylene had a density of 0.920 g/cc, a melt index of 1.1 dg/min and a Melt Flow Ratio of 26.0.

Example 10

The continuous gas phase process conditions are given in Table 4 and the resin properties are given in Table 5. The molar ratio of TMA/Ti was 5. The molar ratio of THF/Ti was 0.3. The concentration of dinitrogen monoxide (N2O) in the polymerization medium was about 350 ppm by volume. 1-Hexene was used as comonomer. The molar ratio $CHCl_3$/Ti was increased from 0.3 to 0.6 in 3 equal steps. Prior to the increase in the molar ratio $CHCl_3$/Ti the average activity of the catalyst was 143 [g PE·(mM Ti)$^{-1}$·h$^{-1}$·(0.1 MPa)$^{-1}$], which corresponds to a prepolymer productivity of 129 kg of prepolymer per kg of polyethylene.

The $CHCl_3$/Ti ratio was increased from 0.3 to 0.4 in one step. After raising the $CHCl_3$/Ti ratio from 0.3 to 0.4, the prepolymer productivity did not change significantly for the first 2 hours. The prepolymer productivity then increased from 129 kilograms of polyethylene per kilogram of prepolymer to about 147 kilograms of polyethylene per kilogram of prepolymer over the next 8 hours.

The $CHCl_3$/Ti ratio was increased from 0.4 to 0.5 in one step. After raising the $CHCl_3$/Ti ratio from 0.4 to 0.5, the prepolymer productivity did not change significantly for the first 4 hours. The prepolymer productivity then increased from 147 kilograms of polyethylene per kilogram of prepolymer to about 160 kilograms of polyethylene per kilogram of prepolymer over the next 6 hours.

The $CHCl_3$/Ti ratio was increased from 0.5 to 0.6 in one step. After raising the $CHCl_3$/Ti ratio from 0.5 to 0.6, the prepolymer productivity did not change significantly for the first 2.25 hours. The prepolymer productivity then increased from 160 kilograms of polyethylene per kilogram of prepolymer to about 182 kilograms of polyethylene per kilogram of prepolymer over the next 22 hours.

Under these conditions a polyethylene free from agglomerates was withdrawn from the reactor at a rate of about 21,700 kg/hr (47,800 lbs/hr). The productivity of the prepolymer was about 182 kilograms of polyethylene per kilogram of prepolymer which corresponds to an activity of about 180 [g PE—(mM Ti)$^{-1}\cdot$h$^{-1}\cdot$(0.1 Mpa)$^{-1}$].

The polyethylene had a density of 0.917 g/cc, a melt index of 0.5 dg/min and a Melt Flow Ratio of 27.3.

Example 11

The process of Example 10 was followed with the following exceptions:
1. the molar ratio of 1-hexene to ethylene was set to about 0.113,
2. the production rate was about 19,000 kg/hr (41,700 lbs/hr)
3. the molar ratio of TMA to titanium was initially set to 7
4. the molar ratio of hydrogen to ethylene was initially set to 0.040,
5. the molar ratio of chloroform to titanium was initially set to 0.0
6. the prepolymer injection rate was initially set to 202 kg/hr (445 lbs/hr)
7. the residual titanium in the polyethylene was initially 14.5 ppm Ti While at these conditions, the molar ratio of CHCl$_3$/Ti was raised in a single step from 0.0 to 1.5. Prior to increasing the CHCl$_3$/Ti molar ratio, the productivity of the prepolymer was about 94 kilograms of polyethylene per kilogram of prepolymer. After raising the CHCl$_3$/Ti molar ratio, the productivity of the prepolymer began decreasing, reaching a minimum value of about 81 kilograms of polyethylene per kilogram of prepolymer approximately 0.5 hours after raising the CHCl$_3$/Ti molar ratio. Approximately 1.5 hours after raising the CHCl$_3$/Ti molar ratio, the prepolymer productivity had returned to the original 94 kilograms of polymer per kilogram of prepolymer and was increasing. The prepolymer productivity eventually increased to about 232 kilograms of polymer per kilogram of prepolymer nearly 30 hours after increasing the CHCl$_3$/Ti molar ratio to 1.5. As the prepolymer productivity increased, prepolymer injection rates were decreased as needed to hold production rate approximately constant. Eventually, prepolymer feed rates had been reduced to about 80 kg/hr (177 lbs/hr).

About 16 hours after increasing the CHCl$_3$/Ti ratio to 1.5, the TMA/Ti molar ratio was reduced from 7 to 4. During the same time, the molar ratio of hydrogen to ethylene was increased from 0.04 to about 0.08 in order to maintain the melt index of the polyethylene being produced to about 0.5 dg/min. After the prepolymer productivity had increased to 232 kilograms of polymer per kilogram or prepolymer, the residual titanium was about 5.8 ppm.

The polyethylene being produced had a density of 0.917 g/cc and a melt index of 0.5 dg/min.

TABLE 4

Reactor Conditions for Examples 6 through 10

| | Example | | | | |
|---|---|---|---|---|---|
| | 6 | 7 | 8 | 9 | 10 |
| Reactor Pressure psig (MPa) | 299(2.06) | 300(2.07) | 300(2.07) | 299(2.06) | 300(2.07) |
| Reactor Temperature ° C. | 86 | 86 | 86 | 86 | 86 |
| Fluidized Bulk Density, lb/ft$^3$ (g/cm$^3$) | 18.0(0.289) | 16.7(0.268) | 17.0(0.273) | 17.6(0.282) | 16.9(0.271) |
| Reactor Bed Height ft (meter) | 51(15.5) | 51(15.5) | 51(15.5) | 51(15.5) | 51(15.5) |
| Ethylene, mole % | 45 | 45 | 45 | 45 | 45 |
| H$_2$/C$_2$[1] | 0.101 | 0.097 | 0.102 | 0.107 | 0.060 |
| C$_6$/C$_2$[2] | 0.090 | 0.093 | 0.093 | 0.091 | 0.104 |
| TMA/Ti[3] | 7 | 7 | 7 | 6 | 5 |
| CHCl$_3$/Ti[4] | 0.04 | 0.10 | 0.20 | 0.30 | 0.60 |
| THF/Ti[5] | 0.3 | 0.3 | 0.3 | 0.3 | 0.3 |
| N$_2$O, ppm by volume | 349 | 349 | 352 | 350 | 350 |
| Prepolymer Rate lb/h (kg/h) | 648(294) | 579(262) | 546(248) | 433(197) | 263(119) |
| Production Rate lb/h (kg/h) | 54800(24900) 47800(21700) | 50500(22900) | 54400(24700) | 56000(25400) | |
| Space Time Yield kg/h-m$^3$ | 80.5 | 74.6 | 80.1 | 82.5 | 70.4 |
| Productivity, mass ratio | 85 | 87 | 100 | 129 | 182 |
| Activity[6] | 90 | 92 | 111 | 143 | 180 |
| Residual Titanium, ppm | 15.9 | 15.4 | 13.5 | 10.4 | 7.4 |

[1]hydrogen to ethylene molar ratio;
[2]1-hexene to ethylene molar ratio;
[3]trimethylaluminum to titanium molar ratio;
[4]chloroform to titanium molar ratio;
[5]tetrahydrofuran to titanium molar ratio;
[6]units of grams PE $\cdot$ (mmole Ti)$^{-1} \cdot$ h$^{-1} \cdot$ (0.1 MPa)$^{-1}$]

TABLE 5

Resin Properties for LLDPE prepared in Examples 6 through 10

| | Example | | | | |
|---|---|---|---|---|---|
| | 6 | 7 | 8 | 9 | 10 |
| Density (g/cc) | 0.920 | 0.920 | 0.920 | 0.920 | 0.917 |
| Melt Index, $I_2$ (dg/min) | 1.1 | 1.0 | 1.0 | 1.1 | 0.50 |
| Melt Flow Ratio ($I_{21}/I_2$) | 26.3 | 26.0 | 26.3 | 26.0 | 27.3 |

From the above data in Examples 1–11 and Tables 1, 2, 3, 4 and 5 the following observations may be made. The addition of non-aromatic halogenated hydrocarbon(s) in a molar ratio to transition metal component of a Ziegler Natta catalyst in the range of 0.2:1 to 3.0:1 provides an increase in catalyst activity as compared with a process carried out outside the specified molar range.

Example 12–28

The process of Example 3 is followed with the exception that in place of chloroform there is used the following saturated halogenated hydrocarbons EXAMPLE 12 dichloromethane,
EXAMPLE 13 fluorotrichloromethane,
EXAMPLE 14 carbon tetrachloride,
EXAMPLE 15 chlorofluoromethane,
EXAMPLE 16 chlorodifluromethane,
EXAMPLE 17 dichlorodifluoromethane,
EXAMPLE 18 fluorodichloromethane,
EXAMPLE 19 chlorotrifluoromethane,
EXAMPLE 20 fluorotrichloromethane,
EXAMPLE 21 1,2-dichloroethane,
EXAMPLE 22 1,2-dibromoethane,
EXAMPLE 23 1,1,1,2-tetrachloroethane,
EXAMPLE 24 2-chloro-1,1,1-trifluoroethane,
EXAMPLE 25 1,1-dichloro-2,2-difluoroethane,
EXAMPLE 26 1,2-dichloro-1,2-difluoroethane,
EXAMPLE 27 hexafluoroethane, and
EXAMPLE 28 hexachloroethane.

In each of the above, Examples 13–29, it is expected that the activity of the catalyst is increased.

It should be clearly understood that the forms of the invention herein described are illustrative only and are not intended to limit the scope of the invention. The present invention includes all modifications falling within the scope of the following claims.

We claim:

1. A process for increasing catalyst activity in a continuous gas phase process for polymerizing ethylene or ethylene and at least one or more other olefin(s) comprising contacting, under polymerization conditions, the ethylene or ethylene and at least one or other olefin(s) with a Ziegler-Natta catalyst comprising at least one transition metal component selected from the group consisting of titanium, zirconium, hafnium and mixtures thereof and a co-catalyst component, and at least one non-aromatic halogenated hydrocarbon(s) wherein at least one or more non-aromatic halogenated hydrocarbon(s) is added in a molar ratio of non-aromatic halogenated hydrocarbon(s) to the transition metal component of the Ziegler-Natta catalyst from 0.2:1 to about 3:1.

2. The process according to claim 1 wherein said non-aromatic halogenated hydrocarbon(s) is selected from the group consisting of dichloromethane; chloroform; carbon tetrachloride; chlorofluoromethane; chlorodifluromethane; dichlorodifluoromethane, fluorodichloromethane; chlorotrifluoromethane; fluorotrichloromethane; 1,2-dichloroethane; 1,2-dibromoethane; 1,1,1,2-tetrachloroethane; 2-chloro-1,1,1-trifluoroethane; 1,1-dichloro-2,2-difluoroethane; 1,2-dichloro-1,2-difluoroethane; hexafluoroethane and hexachloroethane.

3. The process according to claim 1 wherein said non-aromatic halogenated hydrocarbon(s) is selected from the group consisting of chloroform and fluorotrichloromethane.

4. The process according to claim 1 wherein said molar ratio of non-aromatic halogenated hydrocarbon(s) to the transition metal component of the Ziegler-Natta catalyst is from about 0.2:1 to about 2:1.

5. The process according to claim 1 wherein said molar ratio of non-aromatic halogenated hydrocarbon(s) to the transition metal component of the Ziegler-Natta catalyst is from about 0.5:1 to about 1.5:1.

6. A process for increasing catalyst activity in a continuous gas phase process for polymerizing ethylene or ethylene and at least one or more other olefin(s) comprising contacting, under polymerization conditions, the ethylene or ethylene and at least one or more other olefin(s) with a Ziegler-Natta catalyst comprising at least one transition metal component selected from the group consisting of titanium, zirconium, hafnium and mixtures thereof and a co-catalyst component, and at least one or more non-aromatic halogenated hydrocarbon(s) wherein at least one or more non-aromatic halogenated hydrocarbon(s) is added in a molar ratio of non-aromatic halogenated hydrocarbon(s) to the transition metal component of the Ziegler-Natta catalyst in a range of 0.2:1 to about 3:1; wherein said catalyst activity is increased over said range as compared with said process conducted outside said range.

7. The process according to claim 1, 4, 5, or 6, wherein said non-aromatic halogenated hydrocarbon(s) is chloroform.

8. The process according to claim 1, 4, 5, or 6, wherein said transition metal component is titanium.

9. The process according to claim 8 wherein said non-aromatic halogenated hydrocarbon(s) is chloroform.

10. A process for increasing catalyst activity in a continuous gas phase process for polymerizing ethylene or ethylene and at least one or more other olefin(s) comprising contacting, under polymerization conditions, the ethylene or ethylene and at least one or more other olefin(s) with a Ziegler-Natta catalyst comprising at least one transition metal component selected from the group consisting of titanium, zirconium, hafnium and mixtures thereof and a co-catalyst component, and at least one non-aromatic halogenated hydrocarbon(s) wherein at least one or more non-aromatic halogenated hydrocarbon(s) is added in a molar ratio of non-aromatic halogenated hydrocarbon(s) to the transition metal component of the Ziegler-Natta catalyst from 0.4:1 to about 3:1.

11. The process according to claim 10 wherein said non-aromatic halogenated hydrocarbon(s) is selected from the group consisting of dichloromethane; chloroform; carbon tetrachioride; chiorofluoromethane; chiorodiflurometane; dichlorodifluoromethane, fluorodichloromethane; chiorotrifluoromethane; fluorotrichloromethane; 1,2-dichloroethane; 1,2-dibromoethane; 1,1,1,2-tetrachioroethane; 2-chloro-1,1,1-trifluoroethane; 1,1-dichloro-2,2-difluoroethane; 1,2-dichioro-1,2-difluoroethane; hexafluoroethane and hexachloroethane.

12. The process according to claim 10 wherein said non-aromatic halogenated hydrocarbon(s) is selected from the group consisting of chloroform and fluorotrichloromethane.

13. The process according to claim 10 wherein said molar ratio of non-aromatic halogenated hydrocarbon(s) to the transition metal component of the Ziegler-Natta catalyst is from about 0.4:1 to about 2:1.

14. A process for increasing catalyst activity in a continuous gas phase process for polymerizing ethylene or ethylene and at least one or more other olefin(s) comprising contacting, under polymerization conditions, the ethylene or ethylene and at least one or more other olefin(s) with a Ziegler-Natta catalyst comprising at least one transition metal component selected from the group consisting of titanium, zirconium, hafnium and mixtures thereof and a co-catalyst component, and at least one non-aromatic halogenated hydrocarbon(s) wherein at least one or more non-aromatic halogenated hydrocarbon(s) is added in a molar ratio of non-aromatic halogenated hydrocarbon(s) to the transition metal component of the Ziegler-Natta catalyst in a range of 0.4:1 to about 3:1; wherein said catalyst activity is increased over said range as compared with said process conducted outside said range.

15. The process according to claim 10, 13, or 14, wherein said non-aromatic halogenated hydrocarbon(s) is chloroform.

16. The process according to claim 10, 13, or 14, wherein said transition metal component is titanium.

17. The process according to claims 16 wherein said non-aromatic halogenated hydrocarbon(s) is chloroform.

* * * * *

UNITED STATES PATENT AND TRADEMARK OFFICE
CERTIFICATE OF CORRECTION

PATENT NO. : 6,759,492 B2
DATED : July 6, 2004
INVENTOR(S) : Farrer et al.

It is certified that error appears in the above-identified patent and that said Letters Patent is hereby corrected as shown below:

Column 20,
Line 59, "chiorofluoromethane; chiorodifluromethane" should be -- chlorofluromethane; chlorodifluromethane --.
Line 61, "chiorotrifluoromethane" should be -- chlorotrifluoromethane --.
Line 63, "tetrachioroethane" should be -- tetrachloroethane --
Line 64, "1,2-dichioro-1,2-diflouroethane" should read -- 1,2-dichloro-1,2-diflourethane --.
Line 65, "hexachioroethane" should be -- hexachloroethane --.

Column 21,
Line 2, "chioromethane" should be -- chloromethane --.

Signed and Sealed this

Eighth Day of March, 2005

JON W. DUDAS
*Director of the United States Patent and Trademark Office*